United States Patent [19]

Hacon

[11] 3,773,989

[45] Nov. 20, 1973

[54] TOUCH-WIRE OVERLAY MASKS FOR CATHODE RAY TUBES

[75] Inventor: William Frank Hacon, Brentford, England

[73] Assignee: Plessey Handel Und Investments A.G., Zug, Switzerland

[22] Filed: Jan. 22, 1971

[21] Appl. No.: 200,720

[30] Foreign Application Priority Data

Nov. 26, 1970 Great Britain .................. 56,537/70

[52] U.S. Cl. ...... 200/52 R, 200/DIG. 1, 200/DIG. 2, 340/365 R

[51] Int. Cl. .......................................... H01h 35/00

[58] Field of Search ..................... 200/52 R, DIG. 1; 340/365 R

[56] References Cited

UNITED STATES PATENTS

| | | | |
|---|---|---|---|
| 3,503,031 | 3/1970 | Nyhus et al. | 200/DIG. 1 |
| 2,525,769 | 10/1950 | Bruns | 200/DIG. 1 |
| 2,659,533 | 11/1953 | Quinby et al. | 200/DIG. 1 |
| 2,782,406 | 2/1957 | Krakora, Jr. | 200/DIG. 1 |
| 2,896,131 | 7/1959 | Schumann | 200/DIG. 1 |
| 3,492,440 | 1/1970 | Cerbone | 200/DIG. 1 |

*Primary Examiner*—J. R. Scott
*Attorney*—Samuel Scrivener, Jr. et al.

[57] ABSTRACT

A "touch-wire" mask for use in conjuncion with a cathode ray tube which comprises at least one thin flexible transparent plastic sheet carrying metallic touch elements and related conductors formed by printed circuit techniques.

5 Claims, 12 Drawing Figures

TOUCH-WIRE OVERLAY MASKS FOR CATHODE RAY TUBES

The present invention relates to so-called "touch wire" overlay masks for cathode-ray tubes used for information display purposes in respect of data processors.

In the field of data-processing it is common practice to equip data-processor operators' positions with cathode-ray tubes (c.r.t.'s) for the visual presentation of variable items of data compiled by the data processors. Such data is often of a tabulated form comprising numerical and alphabet characters and other symbols, and the items of information, comprising individual symbols or combinations of symbols, appear in coordinate areas of the display face of the tube in much the same manner as tabulated information may be presented on a page of type-script.

When information is being presented in this manner on the face of a c.r.t., the operator may require a data-processing function to be performed in respect of any particular item being displayed. For example he may wish to have the item confirmed or changed, or to have some other manipulation performed in respect of it. To do this it is necessary to provide the data processor with information identifying the item in terms of its appearance location on the c.r.t. face. A so-called touch-wire overlay mask mounted upon the display face of the c.r.t. and connected to suitable response devices enables the item-identification function to be performed in a quick and simple manner merely by the operator applying his finger to the appropriate region of the mask; the point of application preferably being immediately below the particular displayed item. Accordingly the mask is provided with touch-sensitive regions appropriate to the display locations of the tube.

In one interpretation of a touch-wire mask, the body portion is a moulding of rigid transparent plastics material and, the effective portion of each touch-sensitive region comprises a touch-element in the form of a metal stud or the like, the touch-elements being extended electrically over individual small diameter wires (at the inner face of the mask-moulding) to terminals towards the edge of the mask. The terminals are duly connected to individual response devices which are each actuable as a result of the capacitance-to-earth effect of the human body when the finger is applied to the appropriate touch-element.

In another interpretation of a touch-wire mask, catering for co-ordinate identification of data items, the touch sensitive regions each comprise first and second touch-elements which are connected row-wise and column-wise respectively by an array of fine wires at the inner face of the mask moulding; the fine wires being brought out to row and column terminals towards the edge of the moulding. These terminals are duly connected to individual response devices. Accordingly, a particular pair of response devices is operated to co-ordinately identify any particular display location, when the finger is applied to the pair of touch-elements of a sensitive region; one of the response devices being relevant to touch-elements of a particular row wire, and the other being relevant to touch-elements of a particular column wire. As in the first interpretation, actuation of the response devices is effected due to the capacitance-to-earth effect of the human body.

Both known forms of touch-wire mask, or variants thereof possibly using say combinations of the individual and the co-ordinate identification techniques, have the disadvantage that they are costly and time consuming in manufacture. As regards manufacture, the mask moulding of transparent plastics material is of the order of three-sixteenths of an inch thick, and accurately positioned touch-elements are either secured to the outer surface by adhesive or by fitting them in recesses in said surface. However a passage is provided rearwardly of them to permit the provision of permanent connections to the previously-mentioned fine wires. These wires, extending to terminals at the edge of the mask, are fitted at the inside surface of the mask; the preferred method being to place them in grooves formed in the surface and to secure them by transparent electrically-insulating cement. In the case of coordinate wires being employed, the vertical and horizontal grooves would be of different depths to facilitate crossing of the wires without producing short-circuits.

Another disadvantage of a touch-wire mask of the forms mentioned above, is that its appreciable thickness dimension, in conjunction with the thickness of the implosion screen of the c.r.t. face tends to produce optical displacement of a displayed item with respect to the related touch-region as the viewing position is varied.

An object of the present invention is to provide a touch-wire mask which is relatively inexpensive to manufacture and which when fitted to the face of a c.r.t. alleviates the last-mentioned disadvantage.

According to the invention there is provided a flexible touch-wire mask mountable with one surface in abutment with the face of a cathode-ray tube and for use with associated circuitry in the defining of information-display locations at said face, characterized in that it has metallic touch-elements exposed for selective touching by a human finger at its other surface, and comprises at least one thin flexible sheet of transparent plastics material having printed conductor tracks formed on one surface, said tracks providing connections between at least some of said touch-elements and contact-making regions of an integral multipoint connector, the mask being further characterized in that said touch-elements are formed integrally with the conductor tracks.

The invention will be understood by the following description of preferred embodiments which is to be read in conjunction with the accompanying drawings.

Of the drawings

Figure 3:
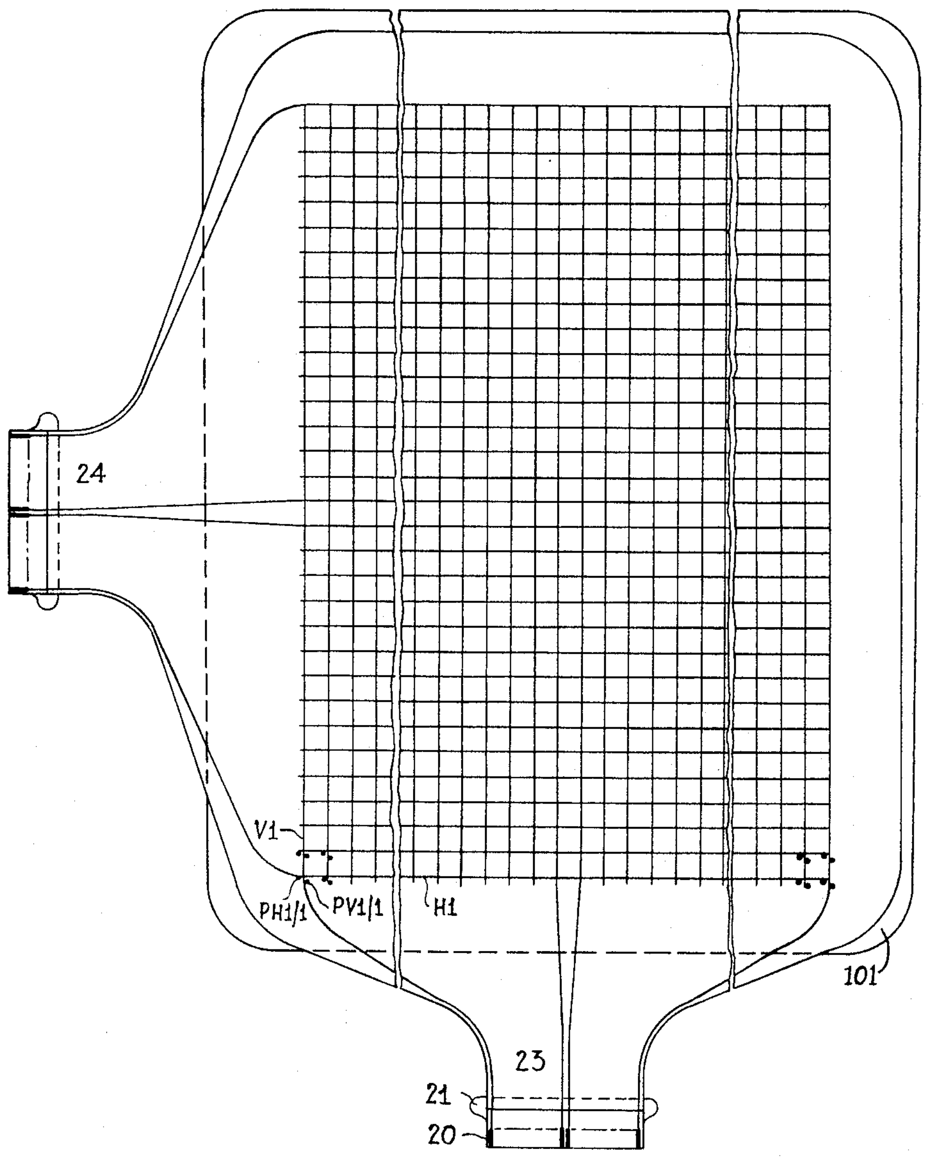
FIG. 3 represents in outline a portion of a proposed form of touch-wire mask mounted upon the face of a cathode-ray tube and providing for co-ordinate indication techniques and employing two integral multi-point plug connectors; one providing terminations for the horizontal identification conductors and one providing terminations for the vertical identification conductors.
Figure 3A:
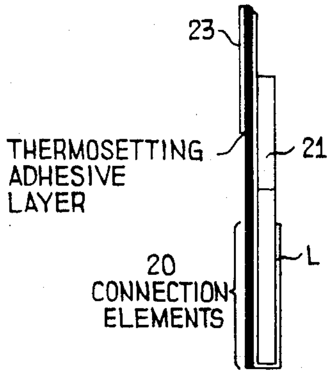

FIG. 3*a* is a side view of the lower tail portion of FIG. 3 terminating on the appropriate multi-point plug connector.

Figure 4:
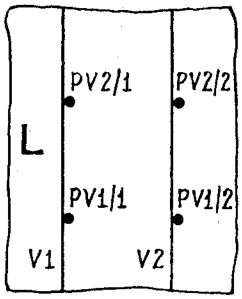
Figure 5:
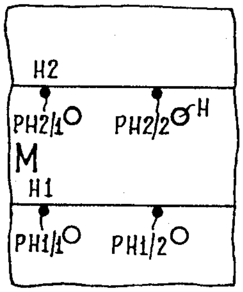
Figure 6:
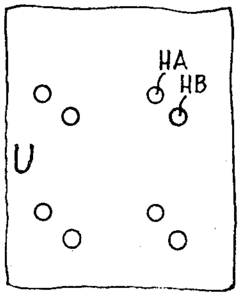
Figure 7:
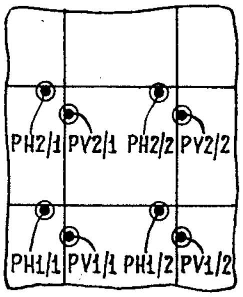
Figure 7A:
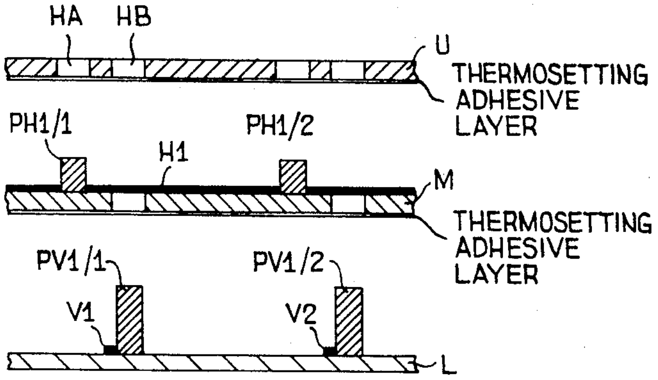
Figure 7B:
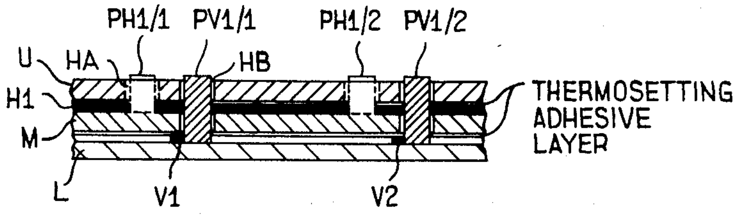

FIGS. 4, 5 and 6 represent corresponding small face-portions of the first, second and third layers of the mask represented in FIG. 3; whereas FIG. 7 is a similar view of a portion of the assembled mask. The upper, lower and middle portions of FIG. 7*a* are cross-sectional views appropriate to FIGS. 6, 5 and 4 respectively, whereas FIG. 7*b* is a cross-sectional view appropriate to FIG. 7.

Figure 8:
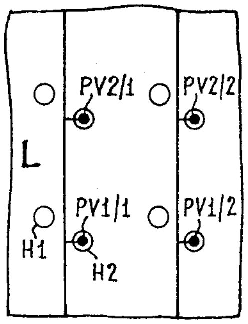
Figure 9:
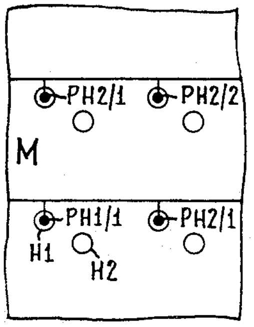

FIGS. 8 and 9 show portions of first and second layers respective of a two-layer touch-wire mask which is functionally similar to that embraced by FIGS. 3 to 7.

Figure 1:
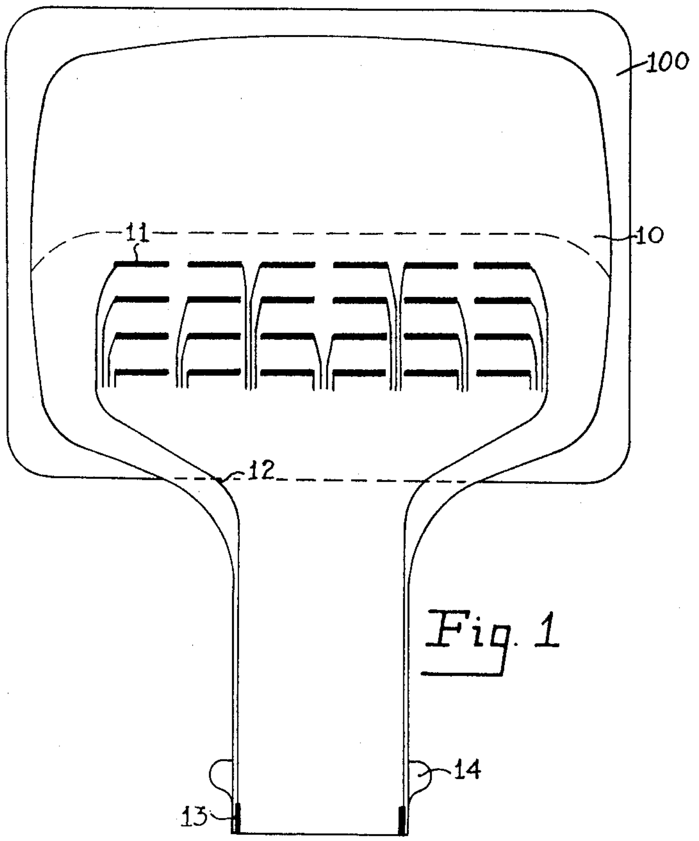
FIG. 1 shows a simple form of touch-wire mask mounted upon the face of a cathode-ray tube and having a plurality of rows of touch elements individually connected to contact members of an integral multi-point plug-connector.

Considering FIG. 1; the touch-wire mask and integral multi-point plug-connector are fabricated from transparent flexible plastics sheet 10 which initially has a film of copper bonded to one face. The contour of the copper-bonded sheet is such that the upper enlarged area corresponds in size to the viewing face 100 of the c.r.t. to which it is eventually to be secured, whereas the lower end of the tail portion, duly formed around and adhesively secured to a plate 14 of insulating material, constitutes the multi-point plug connector. Preferably the plastics material is of the kind known under the trade name "Mylar" and is 0.0024 in. thick whereas the copper film is of the order of 0.0014 in. thick. Prior to fitting the connector-forming plate 14; the conductive pattern (comprising the rows of touch-elements such as 11, the individual conductor tracks such as 12, and the related plug-connection elements 13) is formed by subjecting the flexible copper-bonded sheet to a known process of producing "printed" circuits. Accordingly those areas of the copper film constituting said pattern are treated with acid-resistant material and then the sheet is immersed in etching fluid to remove the unprotected regions of the copper film. After etching, the usual washing and cleaning processes are employed to remove the acid resist and the residual etching fluid. All the retained areas of the conductive pattern may then be given a thin protective layer of gold for example by an electroless-plating process. Finally the whole of that face of the mask carrying the pattern, with the exception of that portion embracing the plug-connection elements and the touch-elements is sprayed with a thin layer of hard-drying transparent epoxy resin ink.

In the particular example, the touch-elements, such as 11 and which are arranged in four rows of six, are 0.06 in. wide and 0.75 in. long, the conductor tracks such as 12 are 0.015 in. wide, whereas the 24 side-by-side plug-connection elements 13, each connected to a pertinent touch-element by a conductor track, are 0.06 in. wide and 0.4 in. long.

Figure 2:
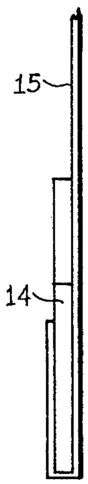
FIG. 2 is a side view of said integral plug-connector.

As represented in FIG. 2 the free end of the tail portion of the mask is formed (plastics substrate 15 innermost) around and adhesively secured to the insulating plate 14 which is provided with finger-holds at its edges. It may be mentioned that, if need be, the exposed connection elements 13 may be of such elongated form that each appears on both faces of the plug-connector, to provide for twin connections with respect to a pair of opposed contact blades of the socket connector into which the plug-connector is duly inserted for establishing connections to the external response devices.

The plastics-substrate side of the enlarged area of the touch-wire mask is secured directly to the face of the c.r.t. by a layer of suitable clear adhesive or by adhesive tape overlapping the pertinent edges of the mask, leaving the tail portion flexible to permit manipulation of the plug-connector.

In respect of FIG. 1, it is to be noted that the portion of the touch-wire mask above the broken line may be removed if required, since it carries no touch-elements or conductors. On the other hand it is pointed out that by making the body of the mask of considerably thicker plastics material and providing other connection arrangements than those employing the tail portion, the mask can be incorporated in the c.r.t. as the implosion screen thereof.

A second form of touch-wire overlay mask depicted in FIG. 3 to 7 and comprising three layers will now be described. This form of mask enables touch areas to be identified in a co-ordinate manner. As in the previous example, the transparent plastics material used in each layer is preferably of the kind known under the trade name "Mylar" and in each case is say 0.0024 in. thick. The first and second layers each have an appropriate printed conductor pattern adherent to its upper face, whereas the third layer has no such pattern. Again as in the previous example the initial conductive patterns, having a thickness of the order of 0.0014 in. are preferably produced on the plastics sheet by submitting the copper-bonded laminate to a selective etching procedure.

The first layer, which is to have the plain face of its major (substantially square) portion in abutment with the face 101 of a c.r.t., has a plurality of equi-spaced vertical conductor tracks, such as V1, formed upon its near face, and each of these tracks has a plurality of equi-spaced and vertically-aligned conductor pads such as PV1/1 merging into it. The particular layer has a tail portion at its base, and the extremity of this is duly used in the formation of a multi-point plug-connector terminating the extensions to the said vertical tracks; said extensions individually merging into plug-connection elements such as 20. The lower extremity, as in the previously described mask, is eventually formed around and secured to an insulating plate 21 to constitute the connector.

In the typical co-ordinate-type mask, having 32 × 32 touch regions, the first layer has 32 narrow vertical conductor tracks such as V1 on 0.5 in. centres and each of these has 32 correspondingly located vertical pads merging with it; the pads also being on 0.5 in. centres. A portion of the first layer L is represented in FIG. 4, and this appertains to the lower regions of the two left-hand vertical conductor tracks as viewed in FIG. 3. Having produced the conductive pattern on the first layer, it is so treated, by a process including copper-plating, as to selectively build-up the height of all the vertical pads, such as PV1/1, PV2/1, PV1/2 and PV2/2, so that their heads will be substantially level with the exposed surface of the mask when the second and third layers are overlayed. At an appropriate stage in the manufacture of the touch-wire mask, the heads of the pads and the surfaces of the plug-connection elements are gold-plated. Indeed the whole of the conductive pattern may be so plated.

The second layer of the mask, having a tail portion emerging at the left, is formed in a similar manner to the first. It is provided with a conductive pattern (on its near face) comprising 32 narrow equi-spaced (0.5 in. centres) horizontal conductor tracks, such as H1, each merging into 32 equi-spaced horizontally aligned pads such as PH1/1, the pads again being on 0.5 in. centres.

The horizontal conductor tracks extend along the tail portion (left hand) to plug-connection elements. The latter as in the case of the lower sheet, are produced concurrently with the remainder of the conductive pattern, and are duly utilised in the formation of an integral plug-connector serving the horizontal conductor tracks and their associated pads; the plug-connector being identical to that serving the vertical conductor tracks.

The second sheet of the mask, a portion (M) of which is represented in FIG. 5 has the typical horizontal pads PH1/1, PH2/1, PH1/2 and PH2/2 built-up by a selective copper-plating process to such a height that their heads will be substantially aligned with the exposed surface of the mask when the third layer is overlayed. Again the heads of the vertical pads and the surfaces of the plug-connection elements (and possibly the remainder of the conductive pattern) are gold-plated at a suitable stage in the manufacture of the mask.

The second layer of the mask is provided with through holes (such as H of FIG. 5) and these geographically coincide with the raised pads of the first layer. Accordingly when the second layer is suitably placed (conductive pattern uppermost) upon the first layer, each of the last-mentioned pads passes snugly through a corresponding hole. The two layers are secured together by clear thermal-setting insulating adhesive and at this stage in the assembly of the mask, the heads of all the pads (vertical and horizontal) stand slightly above the surface of the second layer.

The third or outer layer of the mask, a portion (U) of which is represented in FIG. 6, is again of thin flexible plastics sheet preferably of "Mylar" material, but it has no conductive pattern or film upon it. Instead the sheet is provided with 1024 pairs of through holes such as HA and HB which, when the sheet is suitably placed upon the second layer, allow the corresponding vertical and horizontal pads to snugly pass through them so that the heads of the pads conform with, or are very slightly raised with respect to, the exposed surface of the third layer. The second and third layers of the mask are secured together by clear thermal-setting insulating adhesive between the abutting faces.

The third layer of the mask is provided with foreshortened tail portions 23 and 24 which overlay and are adherent to the related tail portions of the first and second layers of the mask leaving the connection elements of the two integral plug-connectors exposed for cooperation with relevant multi-point socket-connectors.

The enlarged area of the completed mask is secured to the face of the c.r.t. by transparent adhesive or by adhesive tape overlapping the pertinent edges, leaving the tail portions flexible to permit manipulation of the plug-connectors.

The ultimate relationship of the pairs of pads such as PH2/1 and PV2/1 with respect to the co-ordinate conductor tracks can be deduced from FIG. 7 which is indicative of the situation when the three layers of the mask have been assembled.

When the mask is in position upon the c.r.t. face, and connections established by way of the plug-connectors to suitable responding devices, the appearance location of an item of data displayed by the c.r.t. may be identified, in terms of its co-ordinate location, by the operator applying his finger to the related touch region comprising a pair of pads (say PH2/2 and PV2/2) to cause response of the corresponding pair of devices due to the capacitance-to-earth effect of the human body.

The above-described method of manufacturing a touch-wire mask of the general kind illustrated in FIGS. 3 to 7, involves etching away unwanted areas of the copper films of the first and second layers and then building up the various pads to an appropriate height by a selective copper-plating process. According to an alternative method of manufacture, the initial film of copper, adherent to plastics substrate, has a greater thickness than that specified, i.e., it is equal to the final height of the pad required on the particular layer. For each layer, after applying resist material to the pad areas, the remaining unprotected parts of the copper film are subjected to etching to a depth which leaves say 0.0014 in. thickness of copper over those parts. A resist pattern, corresponding to the whole of the conductive pattern (including the raised pads) is duly applied to the residual copper film, the unprotected areas are then etched away, and after cleaning and washing the layer is available for assembly in the manner already described.

In both of the foregoing interpretations of the coordinate-type mask the third layer may be omitted and possibly the height of the pads made less. In this case a protective coating of hard-drying transparent epoxy resin ink or the like would be sprayed over the whole of the exposed face of the second layer with the exception of the touch-elements and the plug-connection elements.

Although in all the forms of touch-wire overlay masks described a particular method of forming the conductive patterns is used, i.e., by etching, it will be understood that other methods possibly involving deposition may well be used.

Reverting to the typical embodiment described with respect to FIG. 1, the fact that the conductor tracks appear in groups, with the tracks appearing side by side, may be considered as unduly interferring with the presentation of displayed information. To overcome this a multi-layer assembly may be resorted to, and this by the utilisation of known "printed-through holes" techniques and the provision of appropriate conductor patterns on the various layers would enable effective stacking of conductor tracks to be effected over the viewing region of the mask.

Another form of co-ordinate-type of touch-wire overlay mask will now be described with respect to FIGS. 8 and 9; this mask being comparable with that described according to FIGS. 3 to 7 but employing two layers corresponding to layers L and M of the previous embodiment. Prior to processing, each layer takes the form of a plastics sheet preferably of the material already specified but having an adherent film of copper on one face and nickel on the other face. The copper is expendable and does not appear in the final product.

In FIGS. 8 and 9, the references for the vertical and horizontal conductor tracks and pads correspond to those of FIGS. 4 and 5 but it will be observed that for each of regularly-spaced two-point touch areas, each layer is provided with two through-holes such as H1 and H2 so located that when layer M is placed upon the layer L, the holes H1 coincide and holes H2 also coincide. Also with respect to each layer it is to be noted that each pad, PV1/1, PH1/1 and the like instead of merging with the relevant conductor track, such as V1 or H2, is connected thereto by a short perpendicular track section. The tracks and pads appear on the underside of each layer and are formed by etching away unwanted portions of the nickel film. It is to be observed that the holes H1 and H2 in the plastics material of each layer, and also formed by etching, are slightly bigger than and concentric with the pertinent pads.

Considering the method of manufacturing the layer M of FIG. 8. Firstly the copper-side of the composite sheet has a suitable etchant resist applied to the whole of it except those regions where the holes H1 and H2 are to be formed, and the sheet is subjected to a first etching process to remove the copper from the regions corresponding to the holes to reveal the plastics substrate thereat. A second etching process, effective only in respect of the plastics material is subsequently applied, and this acting at the regions unprotected by copper produces the holes through the plastics material leaving corresponding regions of the inside face of the nickel film exposed. A third etching procedure is now used to remove all the remaining copper. After this sheet, devoid of copper, has a suitable resist material applied to the whole of the plastics side and to those areas of the nickel-film side which are to constitute the conductive pattern, i.e., tracks, pads and connection elements, whereupon the unwanted areas of nickel are removed by a final etching process. This is followed by a usual cleaning operation. As a result of the foregoing operations (as can be seen from FIG. 8) each of the pads such as PV1/1, included in the nickel conductive pattern formed on the remote face, are supported merely by a short track-section; the pad being evident through the pertinent somewhat larger hole in the plastics material.

The layer M of FIG. 9 is produced in a similar manner to the foregoing, to produce the appropriate holes and to produce the required conductive pattern in nickel on the remote face of the plastics sheet.

In the further fabrication of the mask, the layer M is coated, both sides, with thermal adhesive, and placed on top of layer L, with each layer having its conducting pattern lower-most, and the pairs of holes, such as H1 and H2, in correspondence. Thereupon all the pads are pushed gently upwards through the relevant holes, and continuing the bending function consequently performed on the associated track-sections, the pads are pressed against the face of the upper layer M. Thus the pads finally assume inverted positions, to the left of the holes H2 in the case of pads of the lower layer L, and upwardly of holes H1 in the case of pads of the uppermost layer M.

After the adhesive has been set by heat treatment, unwanted adhesive is removed from the front face (layer M) of the mask and then whole device, excluding the plug-connection elements is sprayed from the rear with clear epoxy resin for protective purposes and to fill holes in the plastics material. Finally the pads and the plug-connection elements are gold-plated. The complete mask having the general contours of that shown in FIG. 3, but with the integral connectors formed by folding the tail portions in the opposite directions, is duly secured to the face of the tube as described.

What we claim is:

1. A flexible touch-wire mask mountable with one surface in abutment with the face of a cathode-ray tube and for use with associated circuitry in the defining of information-display locations at said face, characterized in that it has metallic touch-elements exposed for selective touching by a human finger at its other surface, and comprises at least one thin flexible sheet of transparent plastics material having printed conductor tracks formed on one surface, said tracks providing connections between at least some of said touch-elements and contact-making regions of an integral multi-point connector, the mask being further characterized in that said touch-elements are formed integrally with the conductor tracks.

2. A flexible touch-wire mask mountable with one surface in abutment with the face of a cathode-ray tube and for use with associated circuitry in the defining of information-display locations at said face, characterized in that it has rows and columns of pairs of metallic touch-elements exposed for touching as pairs by a human finger at its other surface and includes first and second thin flexible sheets of transparent plastics material each having printed conductor tracks formed on one of its surfaces, the second of said flexible sheet overlaying and being bonded to the first with the conductor tracks of both sheets directed away from said one surface of the mask, and each track of one sheet is connected to one of the touch-elements of each pair of a separate row and each track of the other sheet is connected to a counterpart touch-element of each pair of a separate column, and in which the touch-elements are formed integrally with the conductor tracks, and a third thin flexible sheet of transparent plastics material overlays and is bonded to the second of said sheets to form a three-layer construction, the second sheet is provided with perforations corresponding to the touch-elements of the first sheet, and the third sheet is provided with perforations corresponding to the touch-elements of the first and second sheets and said touch-elements are so formed with respect to the tracks as to extend their touch surfaces into substantially co-planar relationship with said other surface of the mask.

3. A flexible touch-wire mask as claimed in claim 2 in which said first and second sheets are each provided with a tail-portion along which the pertinent conductor tracks extend in side-by-side relationship and the end region of each said tail-portion is formed around, and secured to, a plate of insulating material to constitute a multi-point plug connector.

4. A flexible touch-wire mask mountable with one surface in abutment with the face of a cathode-ray tube and for use with associated circuitry in the defining of information-display locations at said face, characterized in that it has rows and columns of pairs of metallic touch-elements exposed for touching as pairs by a human finger at its other surface and, includes first and second thin flexible sheets of transparent plastics material each having printed conductor tracks formed on one of its surfaces, the second of said flexible sheet overlaying and being bonded to the first with the conductor tracks of both sheets directed towards said one surface of the mask, and each track of one sheet is connected to one of the touch-elements of each pair of a separate row and each track of the other sheet is connected to a counterpart touch-element of each pair of a separate column, and in which the touch-elements are formed integrally with the conductor tracks, and both sheets are provided with perforations corresponding to all touch-elements of both sheets and the touch-elements are displaced through appropriate perforations and adhesively secured to said other surface of the mask.

5. A flexible touch-wire mask as claimed in claim 4 in which said first and second sheets are each provided with a tail-portion along which the pertinent conductor tracks extend in side-by-side relationship and the end region of each said tail-portion is formed around, and secured to, a plate of insulating material to constitute a multi-point plug connector.

* * * * *